United States Patent
Otten et al.

(10) Patent No.: US 6,272,820 B1
(45) Date of Patent: Aug. 14, 2001

(54) SUGAR CANE HARVESTER

(75) Inventors: Hillrich Otten; Günter Leigers, both of Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/413,067

(22) Filed: Oct. 6, 1999

(30) Foreign Application Priority Data

Oct. 6, 1998 (DE) .......................................... 298 17 799 U

(51) Int. Cl.$^7$ .................................................. A01D 45/10
(52) U.S. Cl. ................................................ 56/13.9; 56/255
(58) Field of Search ................................. 56/13.6, 13.7, 56/13.8, 13.9, 255, 295, 53–62

(56) References Cited

U.S. PATENT DOCUMENTS

| | | | |
|---|---|---|---|
| 299,142 | * 5/1884 | Hilton | 56/295 |
| 3,848,399 | * 11/1974 | Makeham | 56/13.9 |
| 4,035,996 | * 7/1977 | Fernandez et al. | 56/13.9 |
| 4,098,060 | 7/1978 | Quick | 56/13.9 |
| 4,196,566 | * 4/1980 | Donnelley | 56/8 |
| 4,302,922 | * 12/1981 | Guerndt, Jr. et al. | 56/235 |
| 5,546,737 | * 8/1996 | Moosbrucker | 56/295 X |

* cited by examiner

*Primary Examiner*—Robert E. Pezzuto
(74) *Attorney, Agent, or Firm*—Husch & Eppenberger, LLC; Robert E. Muir; Kevin M. Kercher

(57) ABSTRACT

A sugar cane harvester has a cutting mechanism which utilizes pairs of cutting disks and does not require synchronization of the cutting disks. Each of the cutting disks has a revolving cutter mounted on its circumference. The cutters are formed from saw-toothed, concatenated arcuate segments which are removably mounted on the cutting disks. The arcuate segments of each pair of cooperating cutting disks overlap slightly where the two disks meet and are slightly eccentrically arranged on the cutting disks such that the external boundary line of the circumference of the segments tapers off from a maximum to a minimum.

2 Claims, 3 Drawing Sheets

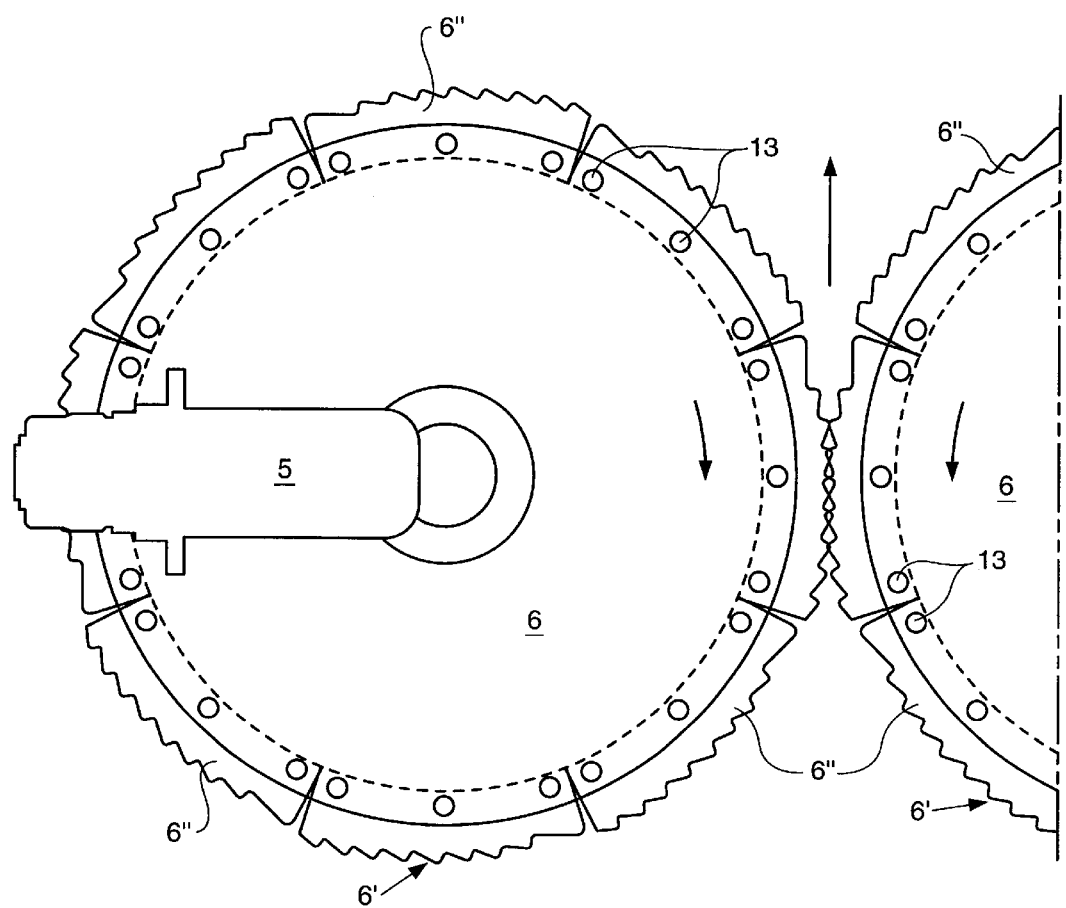

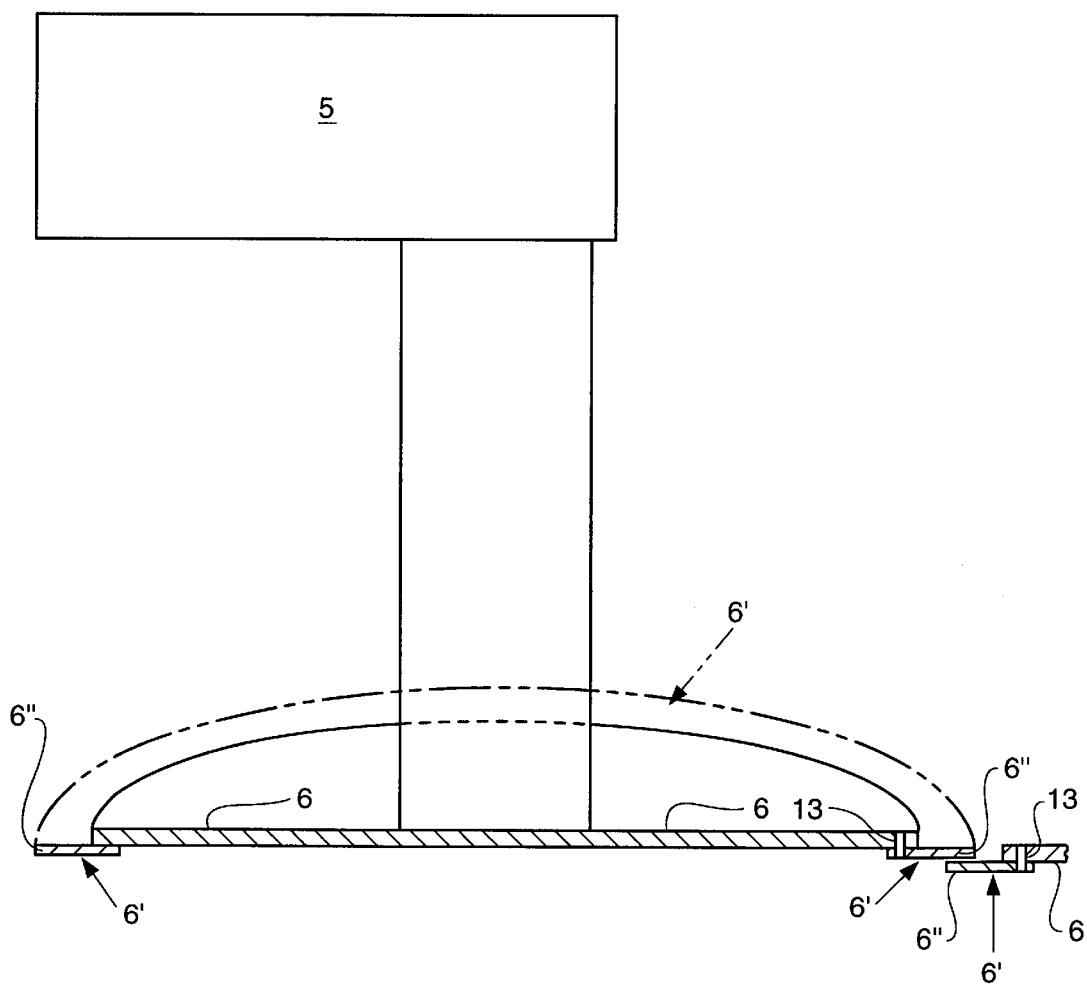

SUGAR CANE HARVESTER

BACKGROUND OF THE INVENTION

The present invention relates generally to agricultural machinery and, more particularly, to an improved sugar cane harvester.

It is known from U.S. Pat. No. 4,098,060 that pairs of cutting disks required to cut sugar cane should be fitted with radially projecting blades arranged at intervals to each other. To obtain a clean cut, the rotation of each pair of cutting disks must be exactly synchronized. This synchronization requires a structurally complex and financially costly special gearbox.

SUMMARY OF THE INVENTION

It is an object of the present invention to facilitate a less expensive and more functionally secure cutting mechanism to harvest sugar cane.

Another object is to simplify the construction of the cutting disks in a sugar cane harvester.

In accordance with the present invention there is provided a sugar cane harvester comprised of a system of cooperating cutting disks, a comminution device which crushes cut stalks of sugar cane, a connecting feed rake which transfers the cut stalks of sugar cane from the cutting disks to the comminution device, at least one cleaning fan which separates chaff that is produced by the comminution of the cut stalks, a discharge conveyer which removes the chaff from the harvester, at least one pair of cooperating cutting disks which rotate without synchronous coordination to cut stalks of sugar cane and a cutter mounted to the circumference of each of the cutting disks.

These and other objects, aspects, features and advantages of the present invention will become apparent from the following detailed description when taking in conjunction with the drawings.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 2 is a top view of two co-operating cutting disks.

FIG. 3 is a front view, in partial section, of the FIG. 2 cutting disks.

DETAILED DESCRIPTION

Figure 1:
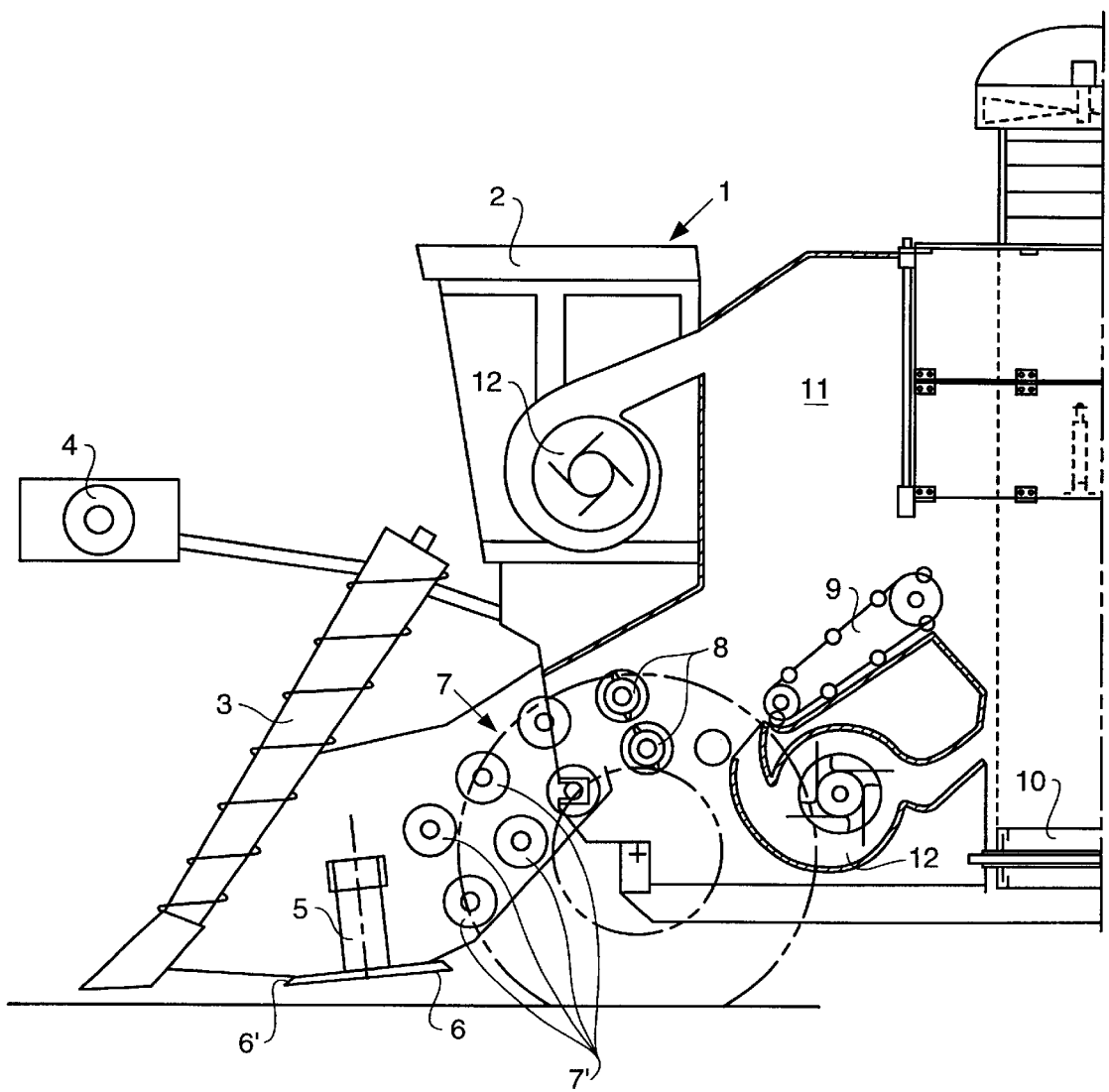
FIG. 1 is a schematic side view of the front section of a self-propelled sugar cane harvester.

FIG. 1 depicts a self-propelled sugar cane harvester 1, having an operator's cab 2, a rotor divider 3 rotating at the front, and a top cutting tool 4. A plurality of bearing brackets 5 are mounted at the front of the harvester and each accommodate a rotatable cutting disk 6, which cooperate in pairs for each row of sugar cane.

FIG. 2 shows the construction of the cutting disks 6. The outer circumference of each cutting disk is defined by a revolving cutter 6'. The cutters 6' are comprised of a plurality of saw-toothed, concatenated arcuate segments 6". These arcuate segments are removably attached to the cutting disks 6 by bolts, or similar removable connectors 13. As can be seen from FIGS. 2 and 3, the outer peripheries of the arcuate segments of each pair of cooperating cutting disks 6 overlap slightly at a tangent point of the two cutting disks. For this purpose, the cooperating cutting disks 6 are offset slightly in a vertical direction as shown in FIG. 3. In addition, the arrangement of the arcuate segments 6" may be slightly eccentric, in that the external boundary line of their circumference tapers off from a maximum to a minimum. This arrangement results in a more effective conveyance of the cut stalks.

Cut stalks of sugar cane are fed by a feed rake 7 formed by pairs of rollers 7' to a comminution device 8 where the stalks are crushed. In one embodiment, the comminution device 8 is in the form of a pair of chopper drums fitted with blades. The comminution device 8 produces chaff which is discarded from the harvester 1. An elevator 9 carries the cut stalks through a cleaning chamber 11 where the chaff is separated from the cut stalks by air flow from two fans 12. From there, the elevator 9 carries the chaff into a discharge conveyor 10 which is conveniently turned to the side of the harvester. Finally, the discharge conveyor 10 removes the chaff from the harvester.

Other objects, features and advantages will be apparent to those skilled in the art. While a preferred embodiment of the present invention has been illustrated and described, this has been by way of illustration and the invention should not be limited except as required by the scope of the appended claims.

We claim:

1. In a sugar cane harvester comprised of a system of at least one pair of cooperating cutting disks, a comminution device which crushes cut stalks of sugar cane, a connecting feed rake which transfers cut stalks of sugar cane from the cutting disks to the comminution device, at least one cleaning fan which separates chaff that is produced by the comminution of the cut stalks, and a discharge conveyer which removes the chaff from the harvester, the improvement comprising:

said at least one pair of cooperating cutting disks which rotate without synchronous coordination to cut the stalks of sugar cane and are offset slightly in a vertical direction and overlap slightly at a tangent point of said at least one pair of cooperating cutting disks; and a cutter replaceably mounted to the circumference of each of said cooperating cutting disks, wherein said cutter is substantially saw-toothed with concatenated arcuate segments.

2. The sugar cane harvester as in claim 1, wherein said concatenated arcuate segments are eccentrically arranged on said at least one pair of cooperating cutting disks such that an external boundary line of a circumference of the concatenated circular arc segments tapers off from a maximum to a minimum along said external boundary line.

* * * * *